United States Patent [19]

Dayen et al.

[11] Patent Number: 4,766,986

[45] Date of Patent: Aug. 30, 1988

[54] ROTATIONAL CONTROL APPARATUS

[75] Inventors: Leonid Dayen, Plymouth; Charles D. Raines, Blaine, both of Minn.

[73] Assignee: Horton Manufacturing Co., Inc., Minneapolis, Minn.

[21] Appl. No.: 11,778

[22] Filed: Feb. 6, 1987

[51] Int. Cl.[4] ...................... F16D 67/04; F16D 25/08
[52] U.S. Cl. ..................... 192/18 A; 192/86; 192/107 R; 192/113 A
[58] Field of Search .............. 192/18 A, 113 A, 70.12, 192/85 CA, 86, 87.17, 107 R; 188/264 A, 264 AA

[56] References Cited

U.S. PATENT DOCUMENTS

| | | | |
|---|---|---|---|
| 1,979,181 | 10/1934 | Wenner | 188/264 A X |
| 2,197,232 | 4/1940 | Wood | 188/264 A X |
| 2,684,744 | 7/1954 | Myers | 192/113 A |
| 2,797,785 | 7/1957 | Earnhardt et al. | |
| 2,809,308 | 10/1957 | Turner | 192/85 CA |
| 3,020,990 | 2/1962 | Liu | |
| 3,087,587 | 4/1963 | Flieg | 192/26 |
| 3,101,010 | 8/1963 | Popovich | 74/700 |
| 3,182,776 | 5/1965 | Sommer | 192/18 A |
| 3,246,725 | 4/1966 | Brashear | 192/18 B |
| 3,378,120 | 4/1968 | Miller et al. | 192/18 A X |
| 3,623,579 | 11/1971 | Hendrickson et al. | 192/113 A X |
| 3,638,773 | 2/1972 | Lewis et al. | 192/18 A |
| 3,674,122 | 7/1972 | Buisker | 192/113 A |
| 3,730,304 | 5/1973 | Buyze | 192/113 A X |
| 3,889,784 | 6/1975 | Hanks | 192/133 A X |
| 4,049,098 | 9/1977 | Kita et al. | 192/8 R |
| 4,074,663 | 2/1978 | Cory | 192/18 A X |
| 4,078,637 | 3/1978 | Hanks | 192/91 A X |
| 4,250,979 | 2/1981 | Kawaguchi | 188/264 A X |
| 4,530,680 | 7/1985 | Miranti | 188/264 A X |
| 4,534,454 | 8/1985 | Brooks | 192/18 A |
| 4,630,718 | 12/1986 | Hanks | 192/18 A |
| 4,633,986 | 1/1987 | Matson | 192/18 A |
| 4,633,991 | 1/1987 | Hanks et al. | 192/85 CA |
| 4,678,349 | 7/1987 | Yoshigai | 384/297 X |

FOREIGN PATENT DOCUMENTS

| | | | |
|---|---|---|---|
| 1906950 | 9/1978 | Fed. Rep. of Germany | 192/107 R |
| 731048 | 6/1955 | United Kingdom | |
| 1147604 | 4/1969 | United Kingdom | |
| 1203860 | 9/1970 | United Kingdom | |
| 2057599 | 4/1981 | United Kingdom | 192/18 A |
| 0716895 | 2/1980 | U.S.S.R. | 188/264 AA |

Primary Examiner—Rodney H. Bonck
Attorney, Agent, or Firm—Peterson, Wicks, Nemer & Kamrath

[57] ABSTRACT

A rotational control apparatus is shown in its most preferred form as a clutch-brake including an improved housing having a cylindrical body portion and first and second housing ends removably secured thereto. The body portion includes an axially extending annular member intersecting with a radially extending annular member. The radially extending annular member forms an interface surface and a surface for reciprocal receipt of a piston inside the axially extending annular member and forms a mounting flange outside the axially extending annular member for securing axially extending bolts threadably received in the second housing end. The first housing end includes an axially extending projection having surfaces for receipt in the axially extending annular member and for reciprocal receipt of the piston. The clutch-brake in its most preferred form further includes an improved friction interface disc including a stamped flat ring portion secured to a second flat ring portion of a cast friction interface element in a spaced condition to form spaced cutouts for heat ventilation. The improved friction interface disc allows easy and inexpensive cast components eliminating casting cores for heat ventilation access between the interface surfaces of the interface disc.

25 Claims, 2 Drawing Sheets

ROTATIONAL CONTROL APPARATUS

BACKGROUND

The present invention relates generally to rotational control apparatus, particularly to apparatus for controlling rotation of an output, and specifically in the preferred form to combination clutch-brakes.

It is often desired to control an output at different conditions such as by a clutch-brake. However, prior clutch-brakes suffered from deficiencies in ease of manufacture, assembly, installation, and maintenance and in their ability to be utilized with differing industrial standard interconnections. Thus, a need has arisen for a clutch-brake having an improved housing utilizing modular, interchangeable, easily and inexpensively cast components which may be machined for varying industrial interconnections and which allow ease of apparatus installation and maintenance.

SUMMARY

The present invention solves these and other deficiencies and problems in rotational control apparatus by providing easily and inexpensivey cast or otherwise formed components which can be easily assembled into a unit which in turn can be easily installed and maintained. In particular, an improved housing is provided including first and second housing ends secured to a cylindrical body portion. The cylindrical body portion includes an integral interface member extending radially inwardly and an integral mounting flange extending radially outwardly of an axially extending annular member. The first housing end is removably secured to the cylindrical body portion and the second housing end is removably secured to the integral mounting flange allowing the apparatus to be readily disassembled into first and second major components which are particularly advantageous for installation and maintenance.

Further, the interface disc having first and second interface surfaces is formed of a first, flat ring portion and a cast interface element including a second, integral flat ring portion. The first, flat ring portion is held in a spaced condition for heat ventilation by upstanding webs cast on the second ring portion eliminating casting cores. Further, the removability of the first ring portion allows better access to the friction lining ring securement to allow removal thereof without requiring dismantling of the cast interface element from the remaining components.

It is thus an object of the present invention to provide a novel apparatus for controlling rotation of an output.

It is further an object of the present invention to provide such a novel rotational control apparatus having an improved housing.

It is further an object of the present invention to provide such a novel rotational control apparatus having an improved interface disc having first and second interface surfaces.

It is further an object of the present invention to provide such a novel rotational control apparatus which can be separated into two major components for installation and maintenance.

It is further an object of the present invention to provide such a novel rotational control apparatus having more torque capacity.

It is further an object of the present invention to provide such a novel rotational control apparatus having faster actuation.

It is further an object of the present invention to provide such a novel rotational control apparatus utilizing modular, interchangeable components.

It is further an object of the present invention to provide such a novel rotational control apparatus utilizing common castings for varying industrial interconnections.

It is further an object of the present invention to provide such a novel rotational control apparatus utilizing components which may be easily and inexpensively cast.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
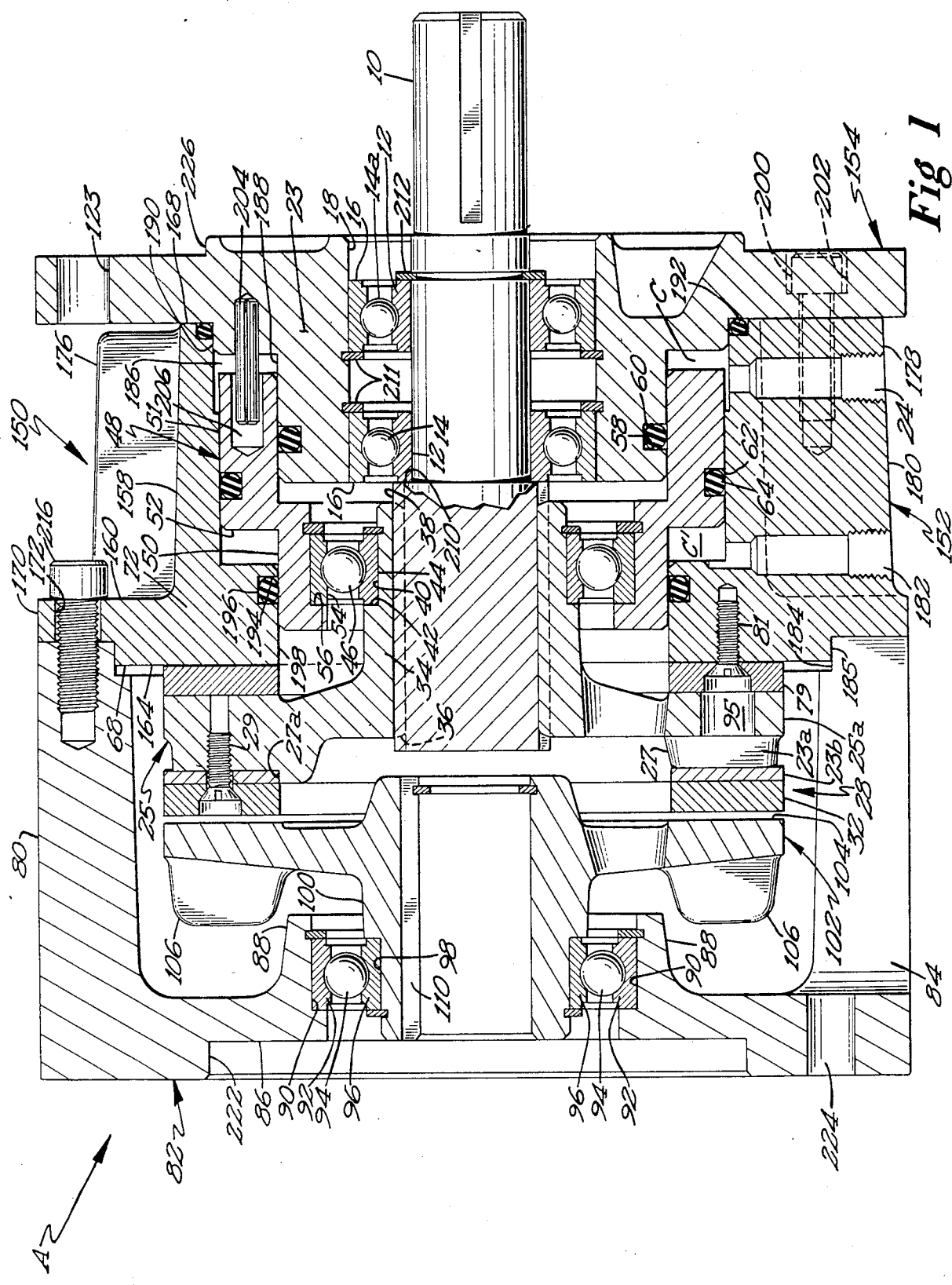
FIG. 1 shows a cross sectional view of a clutch-brake according to the preferred teachings of the present invention.
Figure 2:
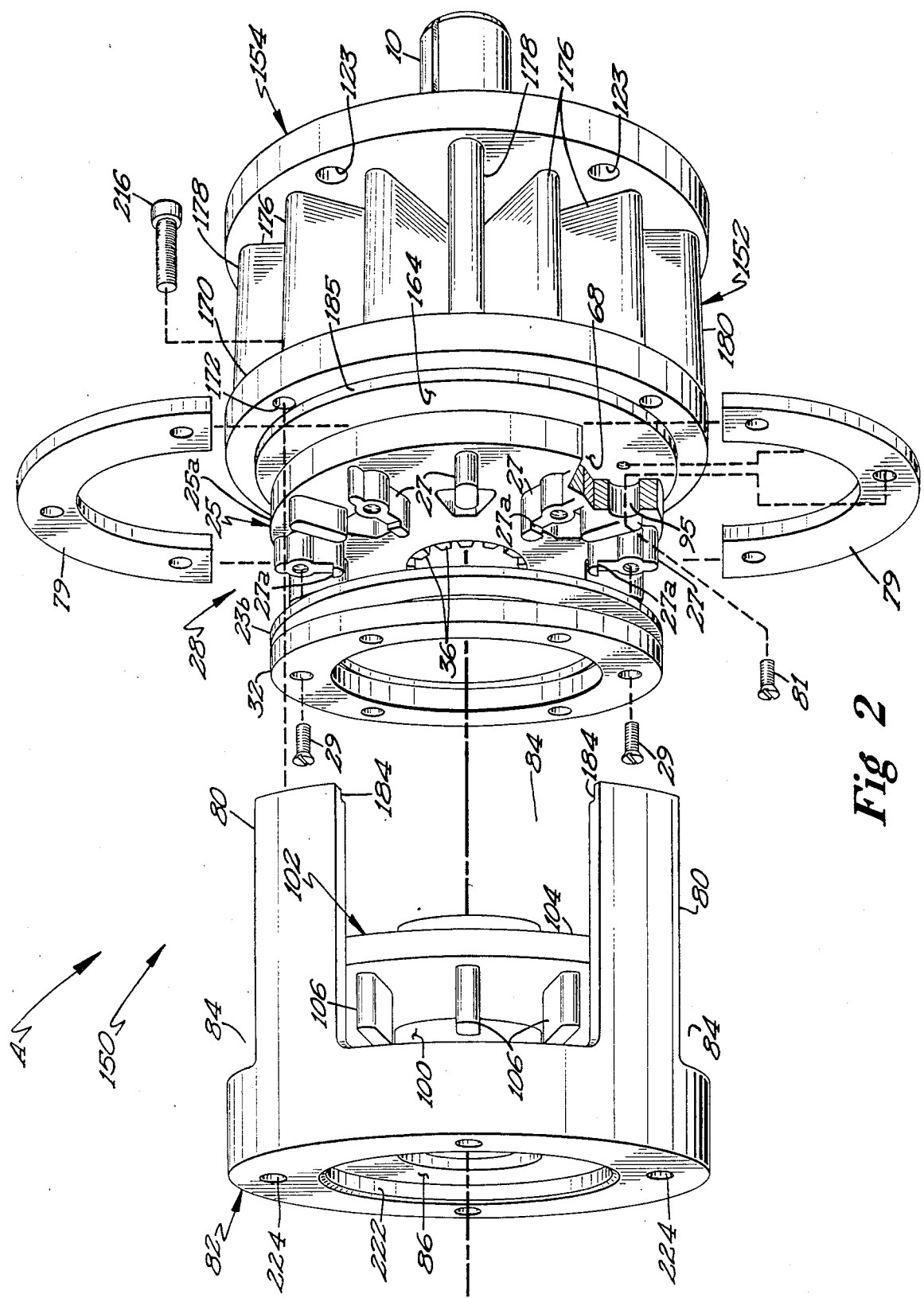
FIG. 2 shows an exploded, perspective view of the clutch-brake of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "inward", "outward", "first", "second", "inside", "outside", "radially", "axially", "circumferentially", and similar terms are used herein, it should be understood that these terms have reference only to the structure shown in the drawings as it would appear to a person viewing the drawings and are utilized only to facilitate describing the invention.

DESCRIPTION

An apparatus for providing rotational control of an output with an input and a housing according to the teachings of the present invention is shown in the drawings and is generally designated A. In the most preferred embodiment of the present invention, apparatus A is a clutch-brake and is an improvement of the type shown and described in U.S. Pat. No. 4,534,454. For purpose of explanation of the basic teachings of the present invention, the same numerals designate the same or similar parts in the present figures and the figures of U.S. Pat. No. 4,534,454. The description of the common numerals and the clutch-brake A may be found herein and in U.S. Pat. No. 4,534,454, which is hereby incorporated herein by reference.

Referring to the drawings in detail, the clutch-brake A includes the driven rotatable output shaft 10. Further provided is the interface disc shown in its preferred form as friction disc 28. In the preferred embodiment, friction disc 28 includes a flat ring portion 23b and a friction interface element 25. Friction interface element 25 includes a flat ring portion 25a having circumferentially spaced, radially extending webs 27 upstanding from the face opposite to the interface surface thereof. Axially extending openings 95 of the type shown and described in U.S. Pat. No. 4,078,637, which is hereby incorporated by reference, are formed in the flat ring portion 25a intermediate webs 27. Webs 27 include axially extending shoulders 27a for receipt of the radially inward axially extending opening of flat ring portion 23b. Bolts 29 threadably received in webs 27 extend through and secure a friction lining ring 32 and the flat ring portion 23b to friction interface element 25 with the face opposite to the interface surface of ring portion 23b abutting with the free ends of webs 27 and spaced from the face of ring portion 25a to form spaced cutouts 23a for heat venting. The friction interface element 25 of disc 28 terminates radially inwardly in the hollow hub 34 formed with splines 36 slidably engaged with splines 38 of shaft 10. Formed on the hub 34 is the annular recess 40 forming the shoulder 42. Mounted in the recess 40 and against the shoulder 42 is the inner race 44 of bearing 46.

The numeral 48 designates an annular piston which includes the axially disposed annular flange portion 50. The outer race 54 of bearing 46 is mounted on the inner surface of piston flange portion 50 and against the shoulder 56 thereby rotatably mounting shaft 10 and a portion of hub 34 within piston 48.

In the preferred embodiment according to the teachings of the present invention, clutch-brake A includes a housing 150 of an improved construction including modular, interchangeable components 82, 152, and 154. Specifically, housing 150 includes a cylindrical body portion 152 having a first, generally axially extending annular member 158 which intersects with a second, generally radially extending annular member 160. Member 158 includes a first, free annular end 164 and a second, free annular end 168. In the most preferred form, annular recess 186 is provided in the radially inward diameter of annular member 158 and adjacent end 168 for allowing ease of assembly.

In the preferred embodiment, member 160 includes an integral, annular body portion 72 located radially inwardly of annular member 158 and extending from the first end 164 toward its second end 168. Annular body portion 72 includes a backing portion 68 for mounting thereon the second, fixed interface member shown as friction lining ring 79 opposite friction interface element 25 of friction disc 28. Friction lining ring 79 in its most preferred form is formed of two, half-moon pieces to allow radial removal without removing friction interface element 25 and is secured by bolts 81 to backing portion 68.

In the preferred embodiment, member 160 further includes an annular, radially extending mounting flange 170 having circumferentially spaced, axially extending apertures 172. Flange 170 is generally located adjacent end 164 of annular member 158 such that body portion 72 is slightly offset from flange 170 and flange 170 is located axially inward of end 164 and of friction lining 79 secured to annular body portion 72.

Body portion 152 further includes in its most preferred form, integral, axially extending, circumferentially spaced fins 176 extending from annular member 158 from flange 170 to a point slightly axially spaced inwardly of end 168. Axially extending, circumferentially spaced mounting shoulders 178 are further provided in the preferred embodiment extending from annular member 158 from flange 170 to end 168 and circumferentially spaced from fins 176. One of the shoulders 178 in the preferred embodiment includes a port enlargement 180 including axially spaced, radially extending air ports 24 and 182.

In the preferred embodiment, housing end 154 is generally planar and circular in configuration having a diameter larger than annular member 158 of cylindrical body portion 152. End 154 includes axially extending, integral, two step projection 23 having a circular opening 18, radially intermediate axially extending surface 188, and radially outward axially extending surface 190 in its most preferred form. Surface 190 has a diameter generally equal to recess 186 and for receipt therein. End 154 is removably secured to cylindrical body portion 152 in its most preferred form by bolts 200 extending through circumferentially spaced, axially extending apertures 202 formed in end 154 and threadably received in mounting shoulders 178 of cylindrical body portion 152. In the most preferred form, apertures 202 include counter sunk entries for receipt of the heads of bolts 200. Suitable fluid sealing provisions 192 such as an O-ring is provided in the preferred embodiment between surface 190 of projection 23 of end 154 and cylindrical body portion 152.

In its most preferred form, annular piston 48 is generally Z-shaped and includes a second, axially disposed annular flange portion 51 and annular portion 52 extending radially between the ends of portions 50 and 51. The radially outer surface of portion 51 is complementary to and for sliding receipt within cylindrical body portion 152 and includes suitable sealing provisions therebetween such as O-ring 64 received within groove 62 formed in the radially outer surface of portion 51. The radially inner surface of portion 51 is complementary to and for sliding receipt on surface 188 of projection 23 and includes suitable sealing provisions therebetween such as O-ring 60 received within groove 58 formed in surface 188 of projection 23. The radially outer surface of portion 50 is complementary to and for sliding receipt within radially inward, axially extending surface 198 of body portion 72 and includes suitable sealing provisions therebetween such as O-ring 196 received within groove 194 formed in surface 198 of body portion 72.

It will be seen that piston 48, bearing 46, hub 34 and friction disc 28 thereof are all slidable on shaft 10. It will be further seen that the void defined by piston 48, cylindrical body portion 152, and end 154 forms a cylinder C to which there is communication by air port 24. It will be further seen that the void defined by piston 48, cylindrical body portion 152, and body portion 72 forms a cylinder C' to which there is communication by air port 182. For rotatably relating piston 48 to housing 150, an antirotation pin 204 shown in its preferred form as a spring pin is secured in end 154 and is slidably received in an aperture 206 formed in the free end of annular flange portion 51 of piston 48. It can then be appreciated that the particular arrangement of pin 204 and its interrelationship to piston 48 and housing end 154 are advantageous in regard to formation of the apertures for receiving pin 204 without wall break through.

Mounted on shaft 10 are the inner races 12 of bearings 14 and 14a with the outer races 16 mounted in the circular opening 18 of housing end 154. Races 12 and 16 of bearings 14 and 14a are retained by a shoulder 210 formed on shaft 10, by retaining rings 211 secured in opening 18 of housing end 154, and by retaining ring 212 secured on shaft 10.

Axially extending fingers 80 of housing end 82 shown in its preferred form as stationary input housing define openings 84 for air cooling and the fingers 80 terminate at their outer edge in the ring like and radially disposed outer end wall 86. Extending inwardly and axially of the wall 86 is the annular flange 88 which has formed on the inner surface thereof the annular recess 90 in which is mounted the outer race 92 of bearing 94. The inner race 96 of bearing 94 is mounted in recess 98 formed on hub 100 of friction disc 102 having friction face 104. The disc 102 is equipped with the spaced cooling fins 106 and the hub 100 is keyed to the live input shaft of a motor or other source of power by means of the keyway 110. Thus, as the power source shaft rotates so does the disc 102.

In the preferred embodiment, the inner diameter of fingers 80 is greater than the outer diameter of axially extending annular member 158. The inner edge of fingers 80 includes an annular recess 184 provided in the inner diameter of fingers 80 of a size and shape complementary to and for slidable receipt on an axially extending shoulder 185 integrally formed on mounting flange 170 of free end 164 of cylindrical body portion 152. Stationary input housing 82 is removably secured to body portion 152 in its most preferred form by bolts 216 extending through apertures 172 and threadably received in the inner edge of fingers 80.

It can then be appreciated that friction discs 28 and 102 are not directly interconnected together, but are only interconnected together through their separate interconnection to housing 150 according to the teachings of the present invention. Therefor, no vibration is transferred between the power source shaft received in hub 100 of friction disc 102 and output shaft 10 due to off center mounting of clutch-brake A. Vibration may cause noise and premature component wear. Thus, rubber coating of splines 36 and/or 38 or other techniques to compensate for vibration are not necessary, reducing the cost of manufacture of clutch-brake A according to the teachings of the present invention.

Stationary input housing 82 includes provisions for mounting housing 150 and clutch-brake A to the motor or other source of power such as by a female C-face 222 and by cap screws received in circumferentially spaced, axially extending apertures 224. End 154 includes provisions for mounting housing 150 and clutch-brake A to the output apparatus such as a gear reducer such as by a male C-face 226 and by circumferentially spaced, axially extending, apertures 123 for receipt of bolts extending from the gear reducer. Shaft 10 may also be keyed to a sheave, a sprocket, a coupling or the like for actuation thereof.

It will be seen that with no air pressure in cylinder C and upon introducing fluid pressure into cylinder C' by a source (not shown) connected to port 182, piston 48 moves towards end 154 whereby flat ring portion 25a of disc 28 is made to contact lining 79 and through hub 34 brake shaft 10'. With no air pressure in cylinder C' and upon introducing fluid pressure into cylinder C by a source (not shown) connected to inlet 24, piston 48 moves towards stationary input housing 82 whereby flat ring portion 25a is separated from lining 79 and as a result there is no braking of shaft 10, and friction lining 32 contacts face 104 of live friction disc 102 whereby shaft 10 is clutched in.

Now that the basic construction and operation of a preferred embodiment according to the teachings of the present invention have been set forth, subtle features and advantages of the present invention can be set forth and appreciated. A first difference between clutch-brake A disclosed herein and clutch-brake A disclosed in U.S. Pat. No. 4,534,454 is that no springs are utilized in the present construction in moving piston 48 whereas springs are utilized for moving the piston in the construction described in U.S. Pat. No. 4,534,454. Separate fluid cylinders C and C' as in the present invention allow more torque capacity in the engagement of the clutch or brake in clutch-brake A. Further, faster actuation of the clutch in clutch-brake A of the present invention is possible because it is not necessary to compress springs as in U.S. Pat. No. 4,534,454. However, it should also be appreciated that clutch-brake A of the present invention obtains many of the advantages gained by clutch-brake A of the U.S. Pat. No. 4,534,454 including prevention of simultaneous clutching and braking of output shaft 10.

A further major difference between clutch-brake A of the present invention and U.S. Pat. No. 4,534,454 is the housing construction. It should then be noted that housing 150 according to the teachings of the present invention is of a modular, interchangeable component type. Specifically, housing ends 82 and 154 of different types and constructions may be utilized and interchanged with a common body portion 152. For example, housing ends 82 and 154 utilizing metric standard interconnections may be utilized with a standard body portion 152 for interconnection between a power source and output apparatus. Similarly, housing ends 82 and 154 utilizing NEMA (inch) standard interconnections may be utilized with the same, standard body portion 152 for interconnection between a power source and output apparatus. It can then further be appreciated that it is even possible to mismatch housing ends 82 and 154 between metric and NEMA standards.

Furthermore, it should be appreciated that since body portion 152 is identical for either metric or NEMA type interconnections, it is then only necessary to manufacture and keep on inventory a single type of body portion 152 rather than separate housing constructions for each type of industry interconnections such as metric or NEMA standards.

Similarly, according to the teachings of the present invention, the remaining components are of identical constructions such as piston 48, friction disc 28, bearings 46 and 94, friction linings 79 and 32 and the like or may be machined from a common casting to either a metric, NEMA, or other industry standard such as shaft 10 and hub 100, and housing ends 82 and 154. Therefore, machining from a common casting greatly reduces the number of casting molds and the capital expenditures required to manufacture clutch-brake A for interconnection with other components of varying industrial standards according to the teachings of the present invention. Further, it is then only necessary to manufacture and keep in inventory a significantly reduced number of components while having clutch-brakes A which fit both metric and NEMA industry standards.

It should be further noted that the preferred construction of cylindrical body portion 152 according to the teachings of the present invention is further advantageous. First, body portion 152 is adaptable for easy casting. Further, the provision of fins 176 allows for the dissipation of heat from clutch-brake A according to the teachings of the present invention without requiring cores during casting. Furthermore, fins 176 structurally reinforce mounting flange 170 and annular member 160.

Similarly, stationary input housing 82 according to the teachings of the present invention is further advantageous. First, stationary input housing 82 is adaptable for easy casting. Specifically, openings 84 of stationary input housing 82 are formed by fingers 80 and thus do not require window cores during casting. Further, the interface interaction locations which are the major source of heat generation are positioned axially within stationary input housing 82 to allow rapid heat dissipation as the result of the axial openings in interface element 25 and friction disc 103, cutous 23a, openings 84 and fins 106.

Additionally, housing 150 and clutch-brake A according to the teachings of the present invention are particularly advantageous when it is necessary to disassemble clutch-brake A for installation and maintenance, such as when the C-face is larger than the bore circle of apertures 224. Specifically, clutch-brake A according to the teachings of the present invention can be separated into two major components, a first component including housing end 82 and friction disc 102 and a second component including body portion 152, housing end 154, friction disc 28, and piston 48 held together by the interconnection of body portion 152 and housing end 154 by bolts 200. Housing end 82 may then be interconnected to the power source by bolts extending through apertures 224 and body portion 152 may be interconnected to housing end 156 by bolts 216, with housing end 154 being interconnected to the output apparatus utilizing bolts received in apertures 123 either before or after the interoonnection of body portion 152 to housing end 82.

Furthermore, due to the preferred construction of housing end 82 and body portion 152 according to the teachings of the present invention, easy access is allowed to friction lining ring 79 due to the offset nature of mounting flange 170 from body portion 72 to allow radial removal from between backing portion 68 and friction interface member 25 without dismantling friction interface member 25 from the second component including body portion 152, housing end 154, and piston 48. Thus, clutch-brake A according to the teachings of the present invention is advantageous in the ease of maintenance and specifically the replacement of friction lining rings 32 and 79 and particularly does not require reaching radially inward of a closed housing for lining replacement.

It should be additionally noted that the preferred construction of friction disc 28 according to the teachings of the present invention is further advantageous. Specifically, friction disc 28 is adaptable for easy casting without requiring casting cores. Specifically, one piece friction disc 28 of the type of U.S. Pat. No. 4,534,454 required spaced cutouts 23a be formed by using cores located between the cavities which formed the flat ring portions of the friction disc 28, greatly increasing the cost of the molds as well as the casting. The two piece construction of friction disc 28 and specifically the construction of friction interface element 25 eliminates the requirement for casting cores for disc heat ventilation as webs 27 which space ring portion 23b and 25a to allow for heat ventilation are formed on and upstand from the rear face of flat ring portion 25a. Flat ring portion 23b need not be cast and may be simply cut or stamped from sheet material, greatly reducing the cost of manufacture.

Furthermore, during maintenance of clutch-brake A and specifically the replacement of friction lining rings 32 and 79, it should be noted that friction disc 28 according to the teachings of the present invention is also of an advantageous construction. Specifically, after housing end 82 is removed by removing bolts 216, bolts 29 may be removed which secure friction lining ring 32 and flat ring portion 23b to friction interface element 25. After removal of ring 32 and portion 23b, easy access is allowed to bolts 81 through openings 95 to allow removal of friction lining ring 79 and in particular it is not necessary to reach through ring portions 23b and 25a and cutouts 23a.

Now that the basic teachings of the present invention have been explained, many extensions and variations will be obvious to one having ordinary skill in the art. For example, although securement of housing ends 82 and 154 to body portion 152 is shown in the preferred embodiment including bolts 200 and bolts 216 and associated structure, other forms of securement may be apparent to one skilled in the art after the teachings of the present invention are known.

Although shown as formed of one piece, friction lining ring 32 may be formed in a manner as friction lining ring 79 to allow interchangability and component inventory and manufacture reduction.

Although air pressure on both sides of piston 48 is utilized to activate clutch-brake A in the preferred form, other forms and types of activation may be utilized in accordance with the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In an apparatus for providing rotational control of an output including an interface disc having first and second interface surfaces, a housing, a first interface member formed on an input for interfacing with the first interface surface of the interface disc, a second interface member formed on the housing for interfacing with the second interface surface of the interface disc, with the improvement comprising an improved housing and an improved interface disc, with the improved housing comprising, in combination: a cylindrical body portion; a first end having a generally circular shape; a second housing end; with the cylindrical body portion including an axially extending annular member having a free annular end, with the second interface member being integral with and extending radially inwardly of the axially extending annular member; a mounting flange extending radially outwardly of the axially extending annular member slightly offset from the second interface member; means for removably securing the first housing end to the free annular end of the axially extending annular member; and means accessible outside of the axially extending annular member of the cylindrical body portion for removably securing the second housing end to the mounting flange of the cylindrical body portion; and with the improved interface disc comprising, in combination: a first, flat ring portion including the first interface surface, a first face opposite to the first interface surface, and a radially inward axially extending opening; an interface element including a second ring portion and means for connecting the second ring portion for rotation with the output, with the second ring portion including the second interface surface and a second face opposite the second interface surface; circumferentially spaced webs upstanding from the second face of the interface element, with the webs having ends, with the second ring portion, the connecting means, and the webs being integrally cast as a single element; and means for removably securing the first, flat ring portion to the interface element with the first face abutting with the free ends of the webs and spaced from the second face of the interface element forming spaced cutouts for heat venting.

2. The apparatus of claim 1 further comprising, in combination: at least a first axially extending opening formed in the second ring portion of the interface element and located intermediate the circumferentially spaced webs for access to the second interface member.

3. The apparatus of claim 1 further comprising, in combination: axially extending shoulders formed on the free ends of the webs for receipt of the radially inward axially extending opening of the first, flat ring portion to aid in positioning of the first, flat ring portion relative to the interface element.

4. The apparatus of claim 1 wherein the free annular end has a diameter; and wherein the apparatus further comprises, in combination: an axially extending projection integrally formed on the first housing end having a radially outward axially extending surface with a diameter generally equal to and for receipt within the diameter of the free annular end of the axially extending annular member.

5. The apparatus of claim 4 further comprising, in combination: a piston; means for interconnecting the piston for axial movement with the interface disc and for rotation relative to the interface disc; and means for reciprocally mounting the piston within the housing comprising, in combination: a radially inward axially extending surface formed on the axially extending projection of the first housing end; an axially extending surface formed on the second interface member of the cylindrical body portion; with the piston comprising, in combination: an axially disposed annular flange portion; with the piston abutting with and for reciprocal movement within the axially extending annular member, with the piston being slidable on the radially inward axially extending surface formed on the axially extending projection of the first housing end, and with the axially disposed annular flange portion of the piston being slidable on the axially extending surface formed on the second interface member of the cylindrical body portion.

6. The apparatus of claim 5 further comprising, in combination: means for sealing between the radially outward axially extending surface formed on the axially extending projection of the first housing end and the free annular end of the axially extending annular member; means for sealing between the piston and the axially extending annular member; means for sealing between the piston and the radially inward axially extending surface formed on the axially extending projection of the first housing end; means for sealing between the axially disposed annular flange of the piston and the axially extending surface formed on the second interface member of the cylindrical body portion, with a first pressure cylinder defined by the piston, the axially extending projection of the first housing end, and the axially extending annular member, with a second pressure cylinder defined by the piston, the second interface member, and the axially extending annular member; means for introducing fluid pressure into the first pressure cylinder; and means for introducing fluid pressure into the second pressure cylinder.

7. The apparatus of claim 5 wherein the piston is generally Z-shaped and further includes a second, axially disposed annular flange portion interconnected to the first, axially disposed annular flange portion, with the second, axially disposed annular flange portion having a radially outer surface and a radially inner surface, with the radially outer surface of the second, axially disposed annular flange portion having a shape and size for reciprocal receipt within the axially extending annular member of the cylindrical body portion, with the radially inner surface of the second, axially disposed annular flange portion having a shape and size for reciprocal receipt on the radially inward axially extending surface of the first housing end.

8. The apparatus of claim 7 wherein the second, axially disposed annular flange portion of the piston includes a free end; and wherein the apparatus further comprises, in combination: an antirotation pin; and an aperture formed in one of the free end of the second, axially disposed annular flange portion of the piston and the first housing end for axial reciprocal receipt of the antirotation pin, with the antirotation pin being axially secured to the other of the free end of the second, axially disposed annular flange portion of the piston and the first housing end.

9. The apparatus of claim 1 further comprising, in combination: circumferentially spaced heat dissipating fins integrally formed with and extending axially from the axially extending annular member and integrally formed with and extending axially from the radially extending mounting flange.

10. The apparatus of claim 9 wherein the means for removably securing the second housing end to the mounting flange comprises, in combination: axially extending bolts having a first end threadably received in the second housing end and having a second end secured to the radially extending mounting flange.

11. The apparatus of claim 10 wherein the output and the first interface member are rotatably mounted with respect to the housing and independent of each other allowing the apparatus to be readily disassembled into first and second major components for apparatus installation and maintenance, with the first major component including the first interface member and the second housing end and with the second major component including the output, the cylindrical body portion, and the first housing end.

12. The apparatus of claim 11 wherein the means for removably securing the first housing end to the axially extending annular member comprises, in combination: bolts extending axially through the first housing end and threadably received in the cylindrical body portion.

13. The apparatus of claim 12 further comprising, in combination: axially extending mounting shoulders integrally formed with and extending axially from the axially extending annular member and the radially extending mounting flange, with the bolts being threadably received in the mounting shoulders.

14. The apparatus of claim 1 wherein the housing is stationary and the apparatus acts as a brake of the output when the interface disc interfaces with the second interface member of the housing.

15. The apparatus of claim 1 wherein the second housing end comprises, in combination: axially extending, circumferentially spaced fingers having an inner diameter, an inner edge and an outer edge; a radially disposed outer wall having an inner opening and an outer edge terminating in and integral with the fingers; and means for rotatably mounting the first interface member within the inner opening of the radially disposed outer wall, with the axially extending annular member of the cylindrical body portion having an outer diameter, with the inner diameter of the fingers being greater than the outer diameter of the axially extending annular member of the cylindrical body portion.

16. The apparatus of claim 15 further comprising, in combination: an annular recess formed in the inner edge of the fingers of the second housing end; and an axially extending shoulder integrally formed on the mounting flange of the cylindrical body portion, with the axially extending shoulder having a size and shape for slidable receipt within the annular recess of the second housing end.

17. The apparatus of claim 16 wherein the second housing end removably securing means comprises bolts extending through circumferentially spaced, axially extending apertures formed in the mounting flange and threadably received in the inner edge of the fingers of the second housing end.

18. The apparatus of claim 15 wherein the radially extending mounting flange is axially offset from the second interface member in the direction of the first housing end.

19. The apparatus of claim 1 wherein the output and the first interface member are rotatably mounted with respect to the housing and independent of each other allowing the apparatus to be readily disassembled into first and second major components for apparatus installation and maintenance, with the first major component including the first interface member and the second housing end and with the second major component including the output, the cylindrical body portion, and the first housing end.

20. The apparatus of claim 1 wherein the means for removably securing the first housing end to the axially extending annular member comprises, in combination: bolts extending axially through the first housing end and threadably received in the cylindrical body portion.

21. The apparatus of claim 20 further comprising, in combination: axially extending mounting shoulders integrally formed with and extending axially from the axially extending annular member, with the bolts being threadably received in the mounting shoulders.

22. The apparatus of claim 1 wherein the means for removably securing the second housing end to the mounting flange comprises, in combination: axially extending bolts having a first end threadably received in the second housing end and having a second end secured to the mounting flange of the cylindrical body portion.

23. An interface disc for an output having first and second interface surfaces comprising, in combination: a first, flat ring portion including the first interface surface, a first face opposite to the first interface surface, and a radially inward axially extending opening; an interface element including a second ring portion and means for connecting the second ring portion for rotation with the output, with the second ring portion including the second interface surface and a second face opposite the second interface surface; circumferentially spaced webs upstanding from the second face of the interface element, with the webs having free ends, with the second ring portion, the connecting means, and the webs being integrally cast as a single element; bolts threadably received in the webs and extending through and removably securing the first, flat ring portion to the interface element with the first face abutting wit the free ends of the webs and spaced from the second face of the interface element forming spaced cutouts for heat venting; and a friction lining ring, with the friction lining ring being removably secured to the first interface of the first, flat ring portion by the bolts removably securing the first, flat ring portion to the interface element.

24. The interface disc of claim 23 further comprising, in combination: at least a first axially extending opening formed in the second ring portion of the interface element and located intermediate the circumferentially spaced webs.

25. The interface disc of claim 23 further comprising, in combination: axially extending shoulders formed on the free ends of the webs for receipt of the radially inward axially extending opening of the first, flat ring portion to aid in positioning of the first, flat ring portion relative to the interface element.

* * * * *

UNITED STATES PATENT OFFICE
CERTIFICATE OF CORRECTION

Patent No. 4,766,986    Dated August 30, 1988

Inventor(s) Leonid Dayen and Charles D. Raines

It is certified that error appears in the above-identified patent and that said Letters Patent are hereby corrected as shown below:

Column 1, line 12, cancel "cf" and substitute therefor --of--.

Column 5, line 63, cancel "10'" and substitute therefor --10--.

Column 7, line 16, cancel "cutous" and substitute therefor --cutouts--.

Column 9, line 12, after "having" insert --free--.

Column 12, line 2, cancel "porticn" and substitute therefor --portion--.

Column 12, line 31, cancel "wit" and substitute therefor --with--.

Column 12, line 35, after "interface" insert --surface--.

Signed and Sealed this

Third Day of January, 1989

Attest:

DONALD J. QUIGG

Attesting Officer    Commissioner of Patents and Trademarks